United States Patent
Ortmann et al.

(10) Patent No.: US 11,441,618 B2
(45) Date of Patent: Sep. 13, 2022

(54) CONDUCTING ELEMENT, HYBRID MODULE AND DRIVE ASSEMBLY

(71) Applicant: Schaeffler Technologies AG & Co. KG, Herzogenaurach (DE)

(72) Inventors: Simon Ortmann, Baden-Baden (DE); Philipp Tepper, Buhl (DE); Dominik Weis, Buhl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 76 days.

(21) Appl. No.: 17/257,914

(22) PCT Filed: Jun. 7, 2019

(86) PCT No.: PCT/DE2019/100519
§ 371 (c)(1),
(2) Date: Jan. 5, 2021

(87) PCT Pub. No.: WO2020/007396
PCT Pub. Date: Jan. 9, 2020

(65) Prior Publication Data
US 2021/0277960 A1  Sep. 9, 2021

(30) Foreign Application Priority Data

Jul. 5, 2018  (DE) .......................... 102018116301.0

(51) Int. Cl.
*F16D 25/0638* (2006.01)
*F16D 25/12* (2006.01)
(Continued)

(52) U.S. Cl.
CPC ............ *F16D 25/123* (2013.01); *B60K 6/387* (2013.01); *F16D 13/52* (2013.01);
(Continued)

(58) Field of Classification Search
CPC ..... F16D 25/123; F16D 13/52; F16D 25/0638
See application file for complete search history.

(56) References Cited

U.S. PATENT DOCUMENTS

| 2017/0089404 A1* | 3/2017 | Ohno | ..................... F16D 13/52 |
| 2017/0144542 A1* | 5/2017 | Pump | ................. B60K 23/0808 |
| 2018/0266497 A1* | 9/2018 | Herman | ............. F16D 25/0638 |

FOREIGN PATENT DOCUMENTS

| DE | 102007003107 | | 8/2007 | |
| DE | 102006055808 A1 * | 6/2008 | | ........... F16D 25/123 |

(Continued)

*Primary Examiner* — Stacey A Fluhart
(74) *Attorney, Agent, or Firm* — Volpe Koenig

(57) ABSTRACT

A conducting element for conducting a pressurized fluid and for conducting a cooling fluid, as well as a hybrid module and a drive assembly having a hybrid module are provided. The conducting element for conducting a pressurized fluid for hydraulically actuating a clutch unit and for conducting cooling fluid for cooling a clutch unit has a cylindrical section and a securing section. At least one pressurized fluid channel is formed in the securing section for transporting pressurized fluid. The conducting element also has at least one cooling fluid channel which has at least one axial direction component in the cylindrical section, wherein the flow line element is fluidically connected to the cooling fluid channel for supplying a clutch unit and/or electric machine with cooling fluid. With this embodiment of the conducting element, a possibility for fluid conducting is created which combines the transport of cooling fluid and pressurized fluid in a fluidically separated manner and with limited axial installation space.

18 Claims, 8 Drawing Sheets

(51) Int. Cl.
　　　*B60K 6/387*　　　(2007.10)
　　　*F16D 13/52*　　　(2006.01)
　　　*F16D 121/04*　　　(2012.01)
　　　*F16D 125/04*　　　(2012.01)
　　　*F16D 125/08*　　　(2012.01)

(52) U.S. Cl.
　　　CPC ...... *F16D 25/0638* (2013.01); *F16D 2121/04* (2013.01); *F16D 2125/04* (2013.01); *F16D 2125/08* (2013.01)

(56) References Cited

FOREIGN PATENT DOCUMENTS

| | | | |
|---|---|---|---|
| DE | 102015215877 | 2/2017 | |
| EP | 1215418 | 6/2002 | |
| WO | WO-2004104439 A1 * | 12/2004 | ............ F16D 21/06 |
| WO | 2018024281 | 2/2018 | |

* cited by examiner

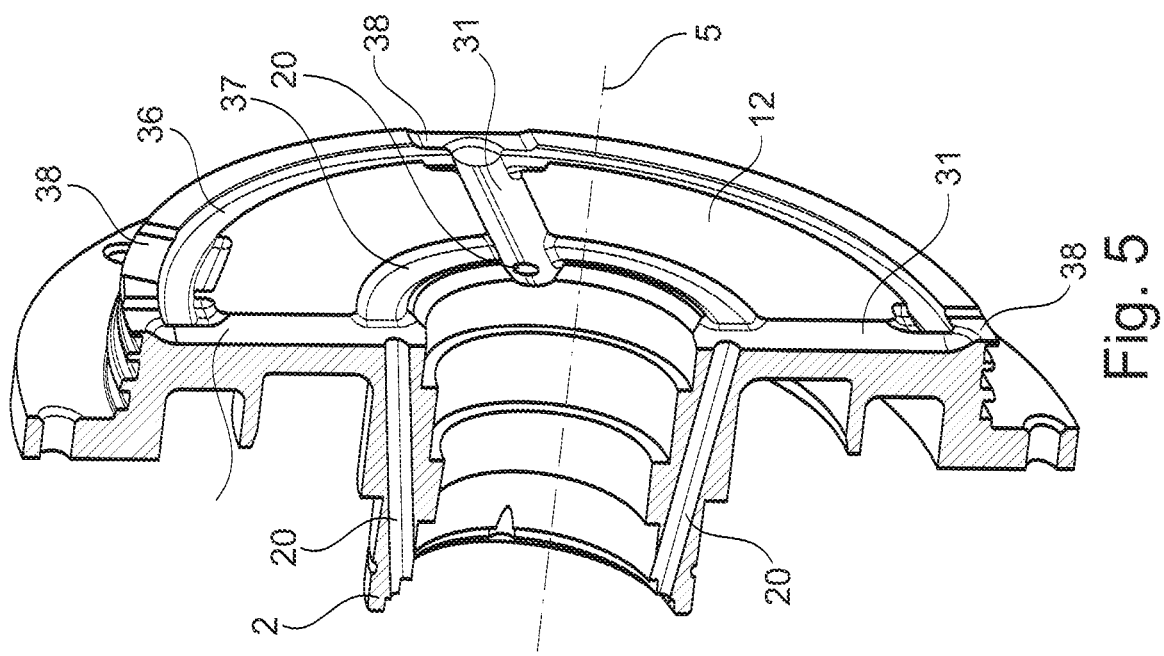
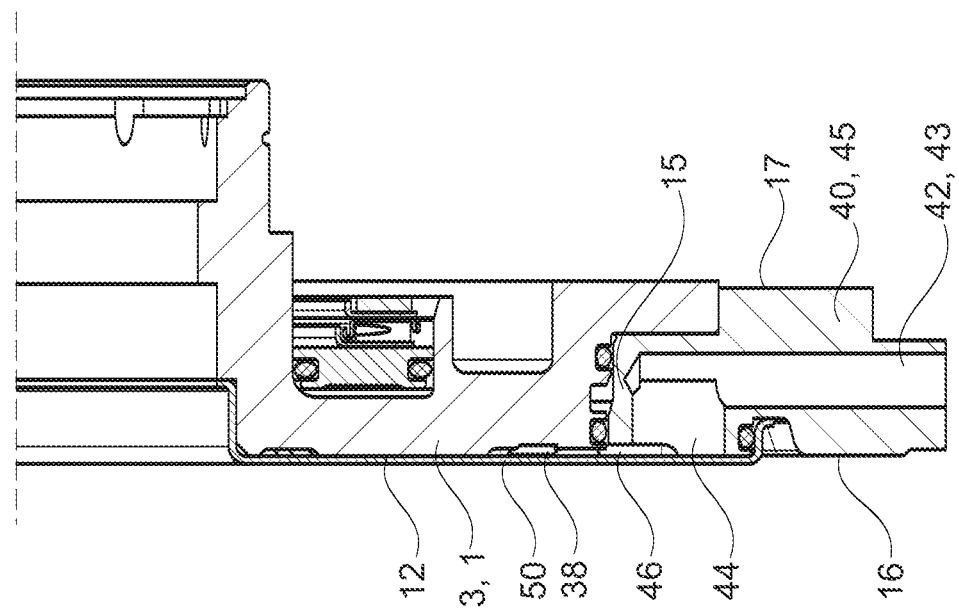

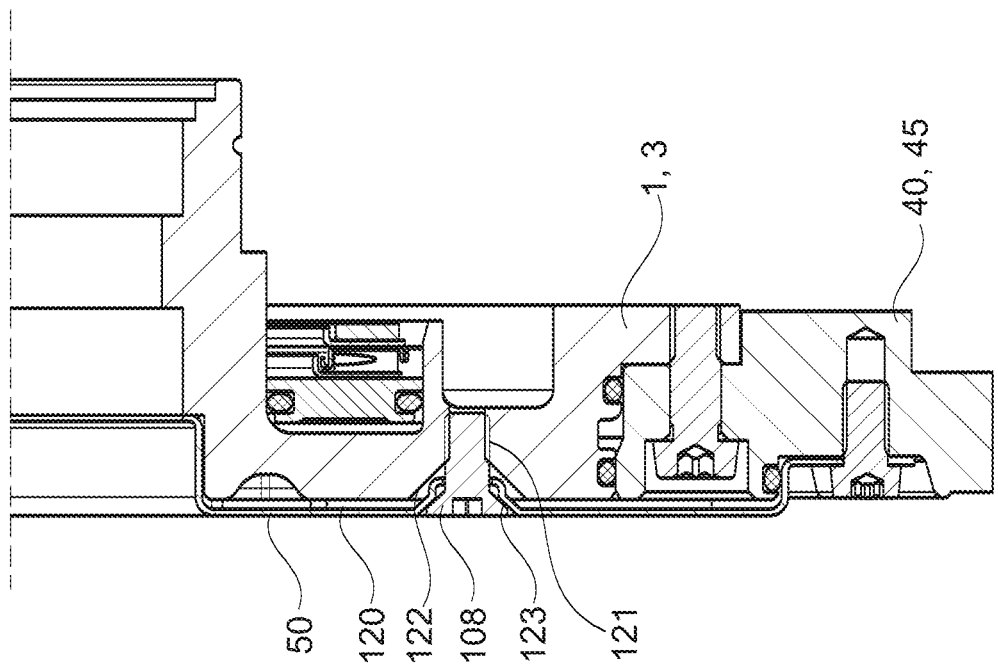
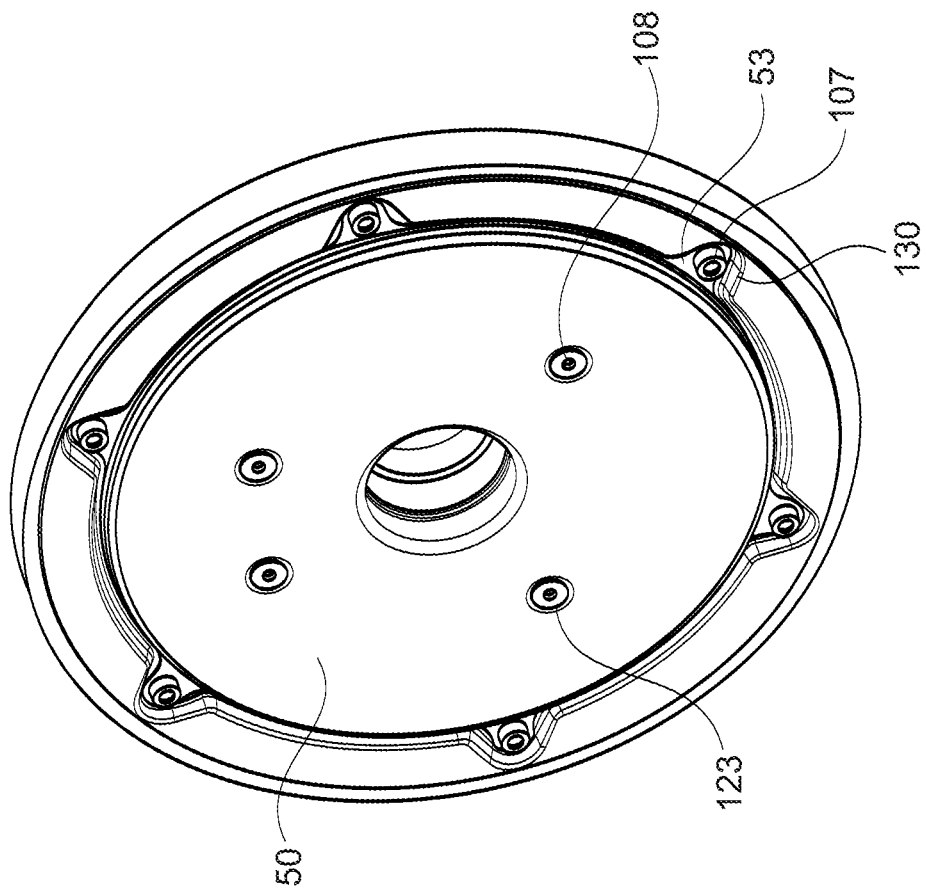

CONDUCTING ELEMENT, HYBRID MODULE AND DRIVE ASSEMBLY

TECHNICAL FIELD

A conducting element for conducting a pressurized fluid for hydraulically actuating an actuating device of a clutch unit as well as for conducting a cooling fluid for cooling a clutch unit. A hybrid module, comprising a housing as well as a conducting element that is mechanically rigidly connected thereto is also provided. A drive assembly having a hybrid module is also provided.

BACKGROUND

A hybrid module generally comprises a connecting device for mechanically coupling an internal combustion engine, a separating clutch with which a torque can be transmitted from the internal combustion engine to the hybrid module and with which the hybrid module can be separated from the internal combustion engine, an electric machine for generating a drive torque with a rotor and a dual-clutch device, with which a torque can be transmitted from the electric machine and/or from the separating clutch to a drivetrain. The dual-clutch device comprises a first partial clutch and a second partial clutch. An actuation system is assigned to each clutch.

The electric machine enables the electric drive, the increase of power for the operation of the internal combustion engine and recuperation. The separating clutch and its actuation system ensure the coupling or uncoupling of the combustion engine. If a hybrid module with a dual clutch is integrated into a drivetrain in such a way that the hybrid module is located in the direction of torque transmission between the internal combustion engine and the transmission, the internal combustion engine, the hybrid module, the dual clutch with their actuation systems and the transmission must be arranged one behind the other or next to one another in the vehicle. Such a hybrid module is also referred to as a P2 hybrid module.

However, such an arrangement often results in significant installation space problems.

From the prior art, hybrid modules are known in which cooling fluid for the clutch is conveyed from the transmission and passed through the transmission input shaft. From there, the cooling fluid is transported to the clutch via radially extending bores.

It is also known that the pressurized fluid is transported, via a pressure line formed in a housing element, for the purpose of supplying a hydraulic actuating device.

SUMMARY

On this basis, the object is to provide a conducting element as well as a hybrid module equipped therewith and a drive assembly which combine the transport of pressurized fluid and cooling fluid with little axial installation space requirement.

The object is achieved by the conducting element with one or more features as described herein. Advantageous embodiments of the conducting element are listed below and in the claims. In addition, there are provided a hybrid module for a motor vehicle, having the conducting element, and a drive assembly, having the hybrid module according, both including one or more of the features described herein.

The features of the claims may be combined in any technically useful way, including the explanations given in the following description and features of the figures which comprise additional embodiments.

In the context of the present disclosure, the terms "radial", "axial", and "circumferential direction" always relate to the cylinder axis of the conducting element, which corresponds to the axis of rotation of the clutch unit or the axis of rotation of the electric machine or the axis of rotation of the hybrid module when the conducting element is integrated in a hybrid module.

The disclosure relates to a conducting element for conducting a pressurized fluid for hydraulically actuating an actuating device of a clutch unit as well as for conducting a cooling fluid for cooling a clutch unit, comprising a cylindrical section, in particular a hollow cylindrical section, as well as a securing section which is arranged in a plane extending essentially in a direction perpendicular to the cylinder axis of the cylindrical section and mechanically connected to the cylindrical section.

At least one pressurized fluid channel is formed in the securing section, extending essentially radially to the cylinder axis, for transporting pressurized fluid radially inward for the purpose of supplying a hydraulic actuating device which is arranged or arrangeable on or in the securing section. Furthermore, the securing section forms, on an axial outside, in particular the axial outside, which is axially opposite the arrangement of the cylindrical section, at least one flow line element, which extends essentially radially to the cylinder axis, for transporting cooling fluid radially inward.

The conducting element furthermore has at least one cooling fluid channel, which is formed in the cylindrical section with at least one axial direction component, wherein the flow line element is fluidically connected to the cooling fluid channel for the purpose of supplying cooling fluid to a clutch unit and/or electric machine that is arranged or arrangeable in the surroundings of the conducting element.

According to a further aspect of the disclosure, the securing section forms a hollow-cylindrical space for the formation of an annular actuating cylinder of the actuating device for the purpose of receiving an annular piston. The pressurized fluid channel is fluidically connected to the hollow-cylindrical space in order to conduct a pressurized fluid into the hollow-cylindrical space for the purpose of moving a piston arranged there.

Alternatively, the conducting element arranged in a hybrid module can be mechanically connected to a piston-cylinder unit, wherein the piston-cylinder unit realizes the actuating device for a clutch unit.

The conducting element can also form two hollow-cylindrical spaces, wherein the annular piston is arranged or arrangeable in the first hollow-cylindrical space and a restoring element, such as a return spring of the actuating device, is arranged or arrangeable in the second hollow-cylindrical space.

According to a further advantageous embodiment, the securing section, at least in some regions, forms a circumferential channel on its radial outside which is fluidically connected to the pressurized fluid channel.

Alternatively or in addition to the formation of a circumferential channel on the radial outside of the securing section, such a circumferential channel can be formed in the hybrid module housing, specifically in a region which abuts the radial outside of the securing section.

The subject matter according to the disclosure is also realized such that the flow line element is formed as a depression in the axial surface of the securing section.

In a simple and stable embodiment, a circumferential annular groove for transferring to the flow line element is arranged on or at the axial outside of the securing section, wherein the annular groove is fluidically connected to the flow line element.

Multiple, in particular two, circumferential annular grooves may also be present with different radial intervals from the cylinder axis in order to ensure ideal conduction or ideal distribution of the cooling fluid.

Instead of a circumferential annular groove, an annular shoulder can also be formed in the securing section, which is then limited in the axial direction with a cover element abutting axially, whereby a groove is thus formed.

According to a further embodiment, a flow line element is fluidically connected to multiple cooling fluid channels, in particular three cooling fluid channels. There may also be exactly one flow line element present, which is arranged in or on the securing section, which is then fluidically coupled to multiple cooling fluid channels. In this case, an outlet of a flow line element can connect essentially directly to an inlet of a cooling fluid channel.

According to the disclosure it can also be provided that the conducting element comprises a sealing washer which is arranged axially on the axial outside of the securing section and, at least in some regions, abuts the axial outside of the securing section, wherein the sealing washer comprises a fluid line recess, the contour of which is formed at least around the flow line element in the axial direction.

In one embodiment of the disclosure, the cooling fluid channel is designed as a hollow cylinder and, in addition to its axial direction component in the cylindrical section, also has a radial direction component, wherein the cooling fluid channel approaches the cylinder axis as the distance from the securing section increases. The conducting element may comprise multiple cooling fluid channels. It can be provided that these multiple cooling fluid channels are distributed around the circumference, in particular distributed at regular intervals, or that the multiple cooling fluid channels are arranged in a limited angular range of 10° to 40°, in particular 20° to 30°. In the case of an arrangement distributed around the circumference, in particular four cooling fluid channels can be provided, and in an arrangement in a limited angular range, in particular three cooling fluid channels can be provided.

Furthermore, according to the disclosure, there is provided a hybrid module for a motor vehicle for coupling an internal combustion engine and a transmission, having an electric machine, a hybrid module housing, a conducting element according to the disclosure that is mechanically rigidly connected to the hybrid module housing, a pressure line for supplying a pressurized fluid and a cooling line for supplying a cooling fluid to the conducting element, wherein the pressure line is fluidically connected to the pressurized fluid channel in the securing section of the conducting element and the cooling line is fluidically connected to the flow line element of the conducting element.

If the conducting element is integrated into a hybrid module, a rotary bearing for supporting a clutch unit and for supporting a rotor carrier of a rotor of the electric machine can be located on the radial outside of the cylindrical section of the conducting element. Furthermore, an intermediate shaft can be supported radially on the radial inside of the conducting element via rotary bearings. It can also be provided that the radial outside of the cylindrical section comprises a thread on which a bias nut is arranged in order to apply an axial bias to the rotary bearing. In order to rigidly connect the conducting element to the hybrid module housing, multiple bolt connections can be provided, for example, to ensure securing.

Furthermore, a cover element can be arranged on the axial outside of the securing section of the conducting element. The cover element is designed as a ring around the axis of rotation and abuts the axial outside of the securing section, wherein it can extend further radially outward in the radial direction than the securing section, wherein its protruding radially outer region then abuts the housing section of the hybrid module housing on which the conducting element is arranged. The cover element thus delimits the elements formed on the axial outside of the securing section, such as the flow line element, in the axial direction. The cover element can be fixed to the hybrid module housing and/or the conducting element with bolt connections or it can be caulked in its position axially next to the conducting element. A combination of these fixings or fastenings is also possible, in which case the cover element can be bolted to the hybrid module housing radially on the outside and caulked on the cylindrical section of the conducting element radially on the inside.

In particular, multiple sealing elements can also be provided, such as sealing rings between the hybrid module housing and the cover element and/or a radial shaft sealing ring between the cover element and an intermediate shaft on which the conducting element is arranged.

Due to the sealing elements and the arrangement of the cover element, the cooling fluid and pressurized fluid transported in lines and channels cannot fluidically escape into the environment. Furthermore, the transported fluids, cooling fluid and pressurized fluid, can be fluidically separated from one another by the sealing elements. In addition, the hybrid module can comprise a ventilation channel which is fluidically connected to the circumferential channel, wherein a ventilation valve is arranged in the ventilation channel, whereby it is possible to implement ventilation of the lines and channels, in which, for example, a pressurized fluid can be transported. In the position of use of the hybrid module, for an optimal ventilation function, the ventilation valve is to be arranged at a highest point of the housing section in which the conducting element is arranged.

Furthermore, according to the disclosure, there is provided a drive assembly comprising a hybrid module according to the disclosure and a drive unit, in particular an internal combustion engine, as well as a transmission, wherein the hybrid module is mechanically connected or connectable to the drive unit and the transmission via at least one clutch unit of the hybrid module.

BRIEF DESCRIPTION OF THE DRAWINGS

The disclosure described above is explained in detail below based on the relevant technical background with reference to the associated drawings, which show preferred embodiments. The disclosure is in no way restricted by the purely schematic drawings, although it should be noted that the embodiments shown in the drawings are not limited to the dimensions shown. In the figures

FIG. 4: shows a section of the conducting element arranged in the hybrid module housing, sectioned in a cooling line;

FIG. 5: shows the conducting element shown in a perspective view, sectioned in a cooling fluid channel;

FIG. 11: shows a perspective view of the housing section in which the conducting element is secured, with the cover element;

FIG. 12: shows a section of the conducting element secured in the hybrid module housing with a sealing washer, sectioned in the fixing of the sealing washer;

DETAILED DESCRIPTION

Figure 1:
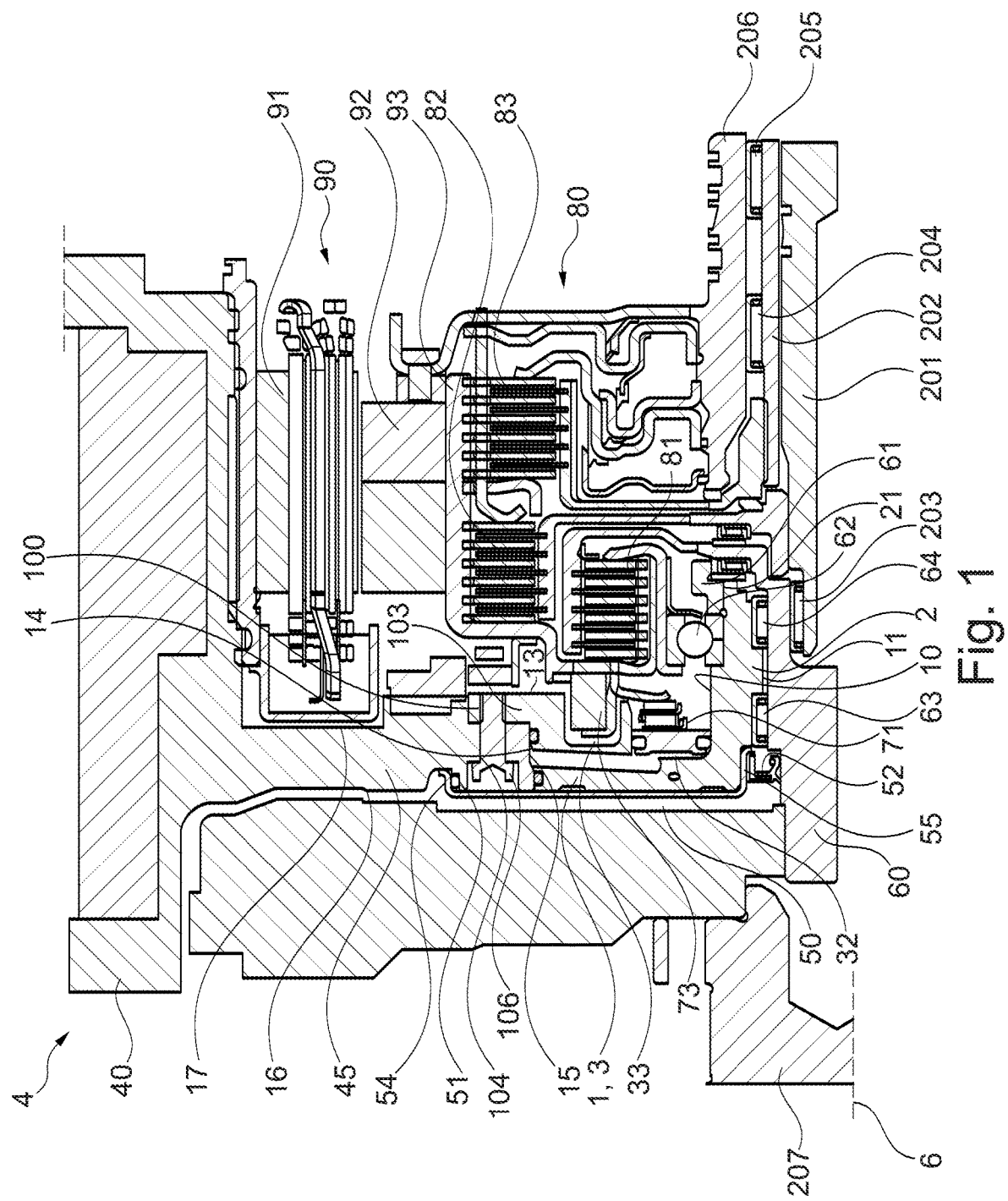
FIG. 1: shows a hybrid module according to one embodiment in a sectional view.

In FIG. 1, a hybrid module 4 according to the one embodiment can be seen in a sectional view. The hybrid module 4 here comprises a conducting element 1 according to the disclosure, an electric machine 90, a clutch unit 80, an actuating device 70, a vibration damper 200, as well as a hybrid module housing 40. In particular, the hybrid module 4 according to the disclosure here is integrable into a drive assembly according to the disclosure. In addition to a hybrid module 4 according to the disclosure, such a drive assembly further comprises a drive unit, in particular an internal combustion engine, as well as a transmission, wherein the hybrid module 4 is mechanically connected or connectable to the drive unit and the transmission via at least the clutch unit 80 of the hybrid module 4. The hybrid module 4 comprises an intermediate shaft 60 which is connected to the internal combustion engine for the purpose of torque transmission.

A first and a second transmission input shaft 201, 202 of the hybrid module 4 are connected to the transmission for the purpose of torque transmission. The axial side from which the intermediate shaft 60 extends into the hybrid module 4 can thus be referred to as the side facing the internal combustion engine.

The conducting element 1 is arranged here radially inside the hybrid module housing 40. The conducting element 1 comprises a cylindrical section 2 and a securing section 3, wherein the securing section 3 extends essentially in the radial direction and being rigidly connected to the cylindrical section 2. The securing section 3 forms a securing protrusion 103 on its radial outside 14, which extends essentially in the radial direction, wherein the securing protrusion 103 has multiple securing bores 100, extending through the securing protrusion 103 in the axial direction. With the radial outside 14 of the securing section 3, the conducting element 1 abuts the radial inside 15 of the housing section 45 of the hybrid module housing 40, and with the axial side of the securing protrusion 103 facing the internal combustion engine, the conducting element 1 abuts the axial inside 17 of the housing section 45 of the hybrid module housing 40. This radial housing section 45 comprises first housing bores 104, extending in the axial direction. When the conducting element 1 is arranged in the hybrid module 4, a respective first housing bore 104 and a respective securing bore 100 are axially aligned so that, using a first bolt 106 screwed into each of the first housing bore 104 and a securing bore 100, a permanent connection between the hybrid module housing 40 and the conducting element 1 is realized.

On the axial inside 13 of the securing section 3, that is to say on the side of the securing section 3 facing away from the combustion force, the conducting element 1 comprises a first hollow-cylindrical space 32 and a second hollow-cylindrical space 33. The two hollow-cylindrical spaces 32, 33 are arranged next to one another in the radial direction, wherein a respective hollow-cylindrical space 32, 33 is open in the axial direction on its side facing away from the internal combustion engine. The radial outside 10 of the cylindrical section 2 forms the radial inside of the first hollow-cylindrical space 32, wherein the radial outside and the side of the first hollow-cylindrical space 32 that face the internal combustion engine are delimited by the securing section 3. Furthermore, the second hollow-cylindrical space 33 is delimited by the securing section 3 on its radial inside and outside as well as on its side facing the internal combustion engine.

The cylindrical section 2 is formed as a hollow cylinder, wherein the intermediate shaft 60 is arranged radially inside the cylindrical section 2. A first rotary bearing 62 is arranged on the radial outside 10 of the cylindrical section 2, on which the clutch unit 80 and, at least indirectly, a rotor carrier 93 rotatable about the axis of rotation 6 of the hybrid module 4, and thereon a rotor 92 of the electric machine 90, are radially supported. Axially next to the first rotary bearing 62, a bias nut 61 is arranged on a thread 21, which is formed on the radial outside 10 of the cylindrical section 2 at the axial end of the cylindrical section 2 facing away from the internal combustion engine. The bias nut 61 applies an axial bias to the first rotary bearing 62. In addition, the intermediate shaft 60 is supported on the radial inside 11 of the cylindrical section 2 via a second rotary bearing 63 and a third rotary bearing 64.

A cover element 50 is arranged axially next to the conducting element 1, on the axial outside 13 of the securing section 3. The cover element 50 is designed as an axially thin metal sheet and to be annular in a plane that is perpendicular to the axis of rotation 6 of the hybrid module 4, wherein the cover element 50 abuts the axial outside 13 of the securing section 3 of the conducting element 1. Here, the cover element 50 extends beyond the conducting element 1 in the radial direction, and its radially protruding outer region abuts the radial housing section 45. The cover element 50 comprises a first axial cover extension 54 and a second axial cover extension 55, which, in the axial direction, extend in the direction facing away from the internal combustion engine. The first axial cover extension 54 is formed on the radial outside of the cover element 50 and abuts the radial housing section 45, wherein a first cover element seal 51 is arranged between the radial housing section 45 and the cover element 50 in the radial direction. The second axial cover extension 55 is formed on the radial inside of the cover element 50 and abuts the radial inside 11 of the cylindrical section 2, wherein a second cover element seal 52 is arranged between the cover element 50 and the intermediate shaft 60 in the radial direction.

The electric machine 90 comprises a stator 91, which is rigidly connected to the hybrid module housing 40, as well as a rotor 92 mounted rotatably about an axis of rotation 6, wherein the rotor 92 is arranged on a rotor carrier 93 and rigidly connected thereto. The rotor 92 or the rotor carrier 93 are supported on the conducting element 1 via the first rotary bearing 62.

The clutch unit 80 comprises a separating clutch 81 as well as a first partial clutch 82 and a second partial clutch 83, wherein the clutch unit 80 is arranged radially inside the electric machine 90, i.e., radially inside the rotor carrier 93. Here, an output element of the separating clutch 81 forms the rotor carrier 93, wherein an output element of the first partial clutch 82 is connected to the first transmission input shaft 201 for the purpose of torque transmission and an output element of the second partial clutch 83 is connected to the second transmission input shaft 202 for the purpose of torque transmission. The first transmission input shaft 201 is arranged at, least in some regions, radially inside the second transmission input shaft 202, which is configured as a hollow shaft. The first transmission input shaft 201 is also arranged radially inside the intermediate shaft 60 in some regions, wherein a fourth rotary bearing 203 is arranged between the radial outside of the first transmission input shaft 201 and the radial inside of the intermediate shaft 60. A fifth rotary bearing 204 and a sixth rotary bearing 205 are arranged on the radial outside of the second transmission input shaft 202, with which the second transmission input shaft 202 is supported on the radial inside of an actuating line carrier 206. The actuating line carrier 206 is connected to an input element of the first and second partial clutches 82, 83 and serves to convey fluid for actuating the first and second partial clutches 82, 83.

The actuating device 70 has a piston 71 and a return spring 73, wherein the actuating device 70 is set up to actuate the separating clutch 81, i.e., to close it using the piston 71 and to open it using the return spring 73. The piston 71 is arranged in the first hollow-cylindrical space 32, and the restoring spring 73 is arranged in the second hollow-cylindrical space 33. The first hollow-cylindrical space 32 thus serves as an actuating cylinder 34 for the piston 71 of the actuating device 70.

The vibration damper 200 is arranged on the side of the hybrid module 4 facing the internal combustion engine and is non-rotatably connected to an output shaft 207, which is connected to the internal combustion engine for torque transmission, and non-rotatably connected to an intermediate shaft 60.

The configuration of the conducting element 1 shown in FIG. 1 and the arrangement of the conducting element 1 in the hybrid module 4 is also representative of the following figures, at least for the figures in which a conducting element 1 or a conducting element 1 arranged in a hybrid module 4 is shown. Accordingly, these subsequent figures show further aspects of the disclosure, some of which are not visible in FIG. 1.

A first possible embodiment of a conducting element 1 integrated in a hybrid module 4 as well as a hybrid module 4 are shown in FIGS. 2 to 7. The section in a respective sectioned figure is selected at such an angular position that a specific aspect of the disclosure can be seen.

Figure 3:
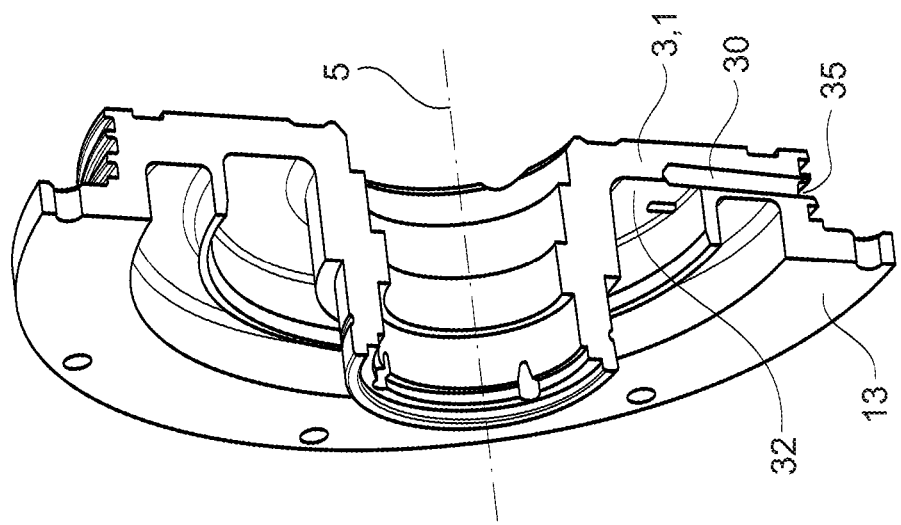
FIG. 3: shows the conducting element shown in a perspective view, sectioned in a pressurized fluid channel.
Figure 2:
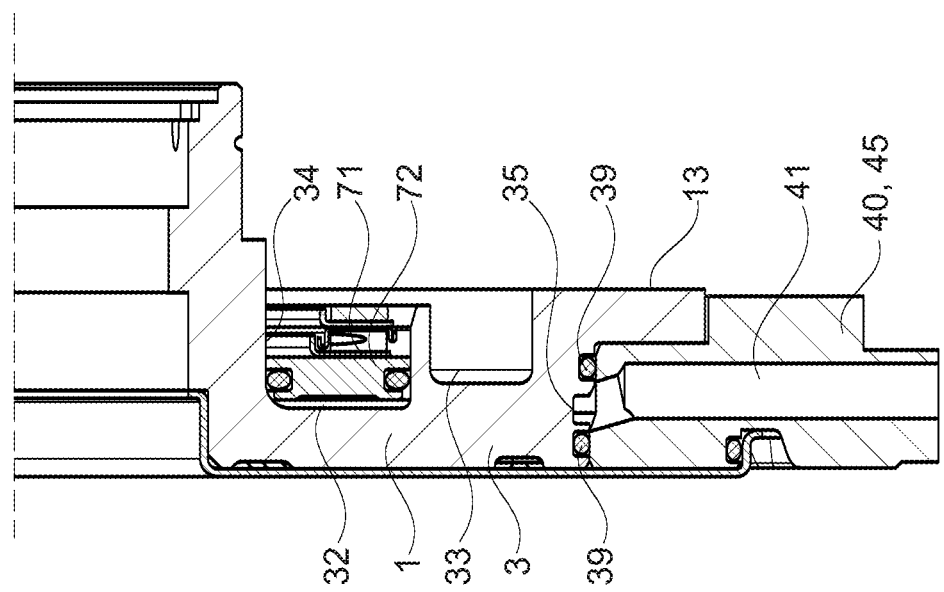
FIG. 2: shows a section of the conducting element arranged in the hybrid module housing, sectioned in a pressure line.

FIGS. 2 and 3 are sectioned to allow understanding the course over which a pressurized fluid can be transported according to the disclosure.

FIG. 2 here shows a section of the conducting element 1 arranged in the hybrid module housing 40, sectioned in a pressure line 41.

A radial housing section 45 of the hybrid module housing 40, on which the conducting element 1 is arranged, is shown, equivalent to the embodiment in FIG. 1. Furthermore, FIG. 2 shows a pressure line 41 arranged in the radial housing section 45. This pressure line 41 extends through the radial housing section 45 in the radial direction, towards the radial side of the radial housing section 45 which the conducting element 1 abuts radially. The conducting element 1 comprises a circumferential channel 35, which is formed as a groove on the radial outside 14 of the securing section 3 of the conducting element 1 and is fluidically connected to the pressure line 41. A pressurized fluid seal 39 is arranged axially on both sides, next to the circumferential channel 35, between the radial housing section 45 and the conducting element 1.

In the first hollow-cylindrical space 32 here, a piston 71 of the actuating device 70 is arranged. The first hollow-cylindrical space 32 functions as an annular actuating cylinder 34, wherein the piston 71 comprises a piston sealing element 72 which delimits the first hollow-cylindrical space 32 fluid-tight against the environment within the hybrid module 4, i.e., against the clutch unit 80 and the electric machine 90.

In addition to FIG. 2, FIG. 3 shows the conducting element 1 in a perspective section in a pressurized fluid channel 30. The illustrated pressurized fluid channel 30 extends through the securing section 3 of the conducting element 1 in the radial direction and fluidically connects the circumferential channel 35 with the space that is delimited by the first hollow-cylindrical space 32 and the piston sealing element 72 (not shown here).

With what is shown in FIGS. 2 and 3, it can be seen that a pressurized fluid can be conducted from the pressure line 41 from the radial housing section 45 of the hybrid module housing 40 into a circumferential channel 35 on the radial outside 14 of the securing section 3, and from there, via a pressurized fluid channel 30 running through the securing section 3, to the piston sealing element 72 of the piston 71 so that the piston 71 can be displaced in the axial direction facing away from the axial inside 13 of the securing section 3, whereby the actuation system 70 can actuate the separating clutch 81.

FIGS. 4 and 5 are sectioned to allow following the course over which a cooling fluid can be transported according to the disclosure.

FIG. 4 here shows a section of the conducting element 1 arranged in the hybrid module housing 40, sectioned in a cooling line 42.

A radial housing section 45 of the hybrid module housing 40, on which the conducting element 1 is arranged, is shown, equivalent to the embodiment in FIG. 1. Furthermore, FIG. 4 shows a cooling line 42 arranged in the radial housing section 45. This cooling line 42 comprises a radial as well as an axial cooling line section 43, 44. The radial cooling line section 43 extends through the radial housing section 45 to the conducting element 1 in the radial direction, but does not exit from the radial inside 15 of the radial housing section 45. The radial cooling line section 43 extends so far in the radial direction that it ends radially further inward than the radial point at which the seal is implemented by means of the first cover element seal 51. The axial cooling line section 44 extends from the axial outside 16 of the housing section 45 in the radial housing section 45 in the axial direction. The axial cooling line section 44 is arranged essentially at the same angular position as the radial cooling line section 43 and extends so far in the axial direction that the two cooling line sections 43, 44 are fluidically connected to one another. Furthermore, a housing overflow section 46 is arranged on the axial outside 16 of the housing section 45. This housing overflow section 46 adjoins the radial inside 15 of the radial housing section 45 and there transitions into a conducting element overflow section 38 formed on the axial outside 12 of the securing section 3. The two overflow sections 38, 46 are designed as axial depressions in the side of the radial housing section 45 or the securing section 3 facing the internal combustion engine so that a fluidic connection between the cooling line 42 and the axial outside 12 of the securing section 3 is realized. The cover element 50 hereby limits the cooling line 42 or its axial cooling line section 44 as well as the two overflow sections 38, 46 in the axial direction.

In addition to FIG. 4, FIG. 5 shows the conducting element 1 in a perspective section in a cooling fluid channel 20. The cooling fluid channel 20 is designed as a hollow cylinder and, with an axial and a radial direction component, extends in the cylindrical section 2, wherein the cooling fluid channel 20 extends in a direction away from the securing section 3 towards the cylinder axis 5. Furthermore, FIG. 5 shows a first and a second circumferential annular groove 36, 37 and multiple flow line elements 31 on the axial outside 12 of the securing section 3. The first circumferential annular groove 36 is arranged radially further outward than the second circumferential annular groove 37. The conducting element overflow sections 38, also shown here, are fluidically connected to the first circumferential annular groove 36. The flow line elements 31 shown are designed as depressions in the axial outside 12 of the securing section 3 and extend in the radial direction, essentially perpendicular to the cylinder axis 5, to the radial center, wherein the flow line elements 31 are arranged in the circumferential direction at regular intervals from one another. The radial outer end region of a respective flow line element 31 is fluidically connected to the first circumferential annular groove 36 and the radially inner end region of a respective flow line element 31 is fluidically connected to the second circumferential annular groove 37, wherein one cooling fluid channel 20 each in the radially inner end region is connected to a respective flow line element 31.

With what is shown in FIGS. 4 and 5, it can thus be seen that a cooling fluid from the cooling fluid line 20 can be transported from the radial housing section 45 of the hybrid module housing 40, via overflow sections 38, 46, to the axial outside 12 of the securing section 3 and there, via the first and second circumferential annular groove 36, 37 as well as multiple flow line elements 31, which are axially limited by the cover element 50, is passed to multiple cooling fluid channels 20, from where it is transported from the axial end region of the cylindrical section 2 facing away from the internal combustion engine into a hybrid module interior, where it is to cool the clutch unit 80.

Figure 7:
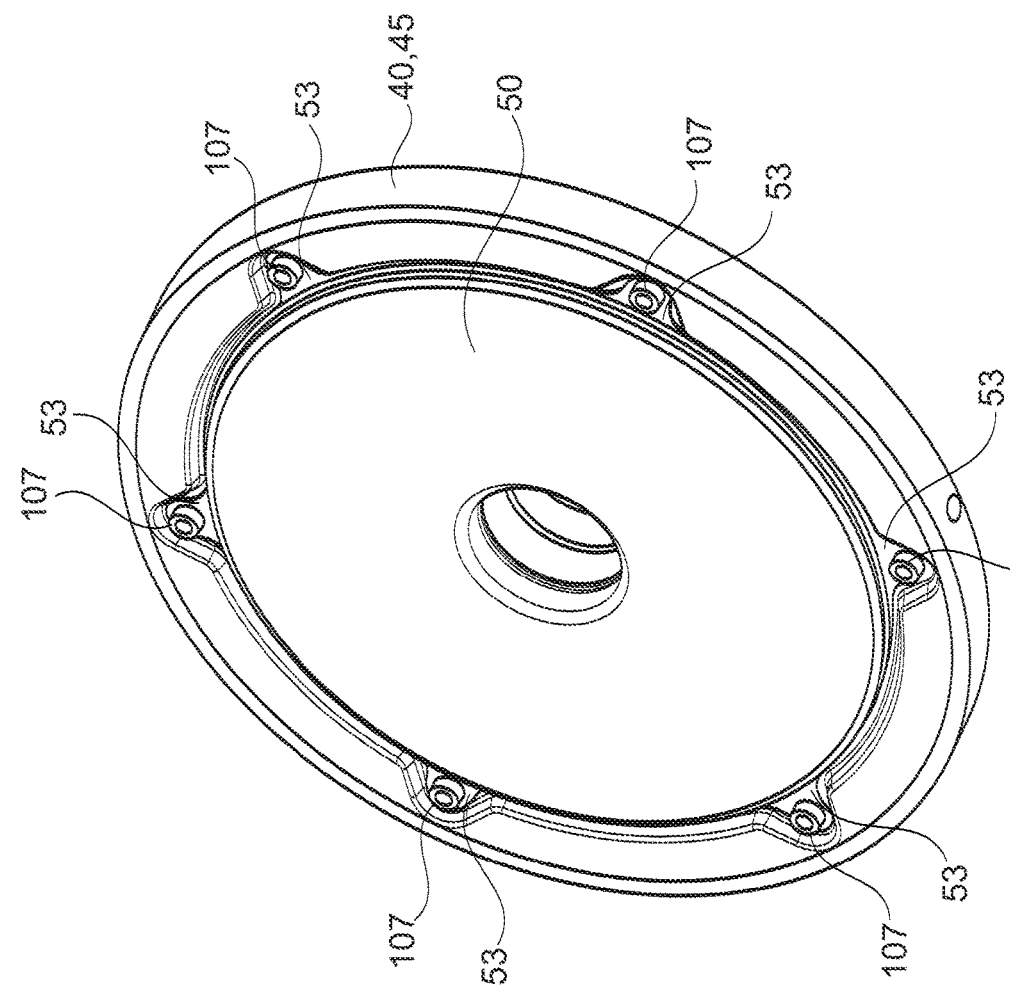
FIG. 7: shows a perspective view of the housing section in which the conducting element is secured, with the conducting element covered by the cover element.
Figure 6:
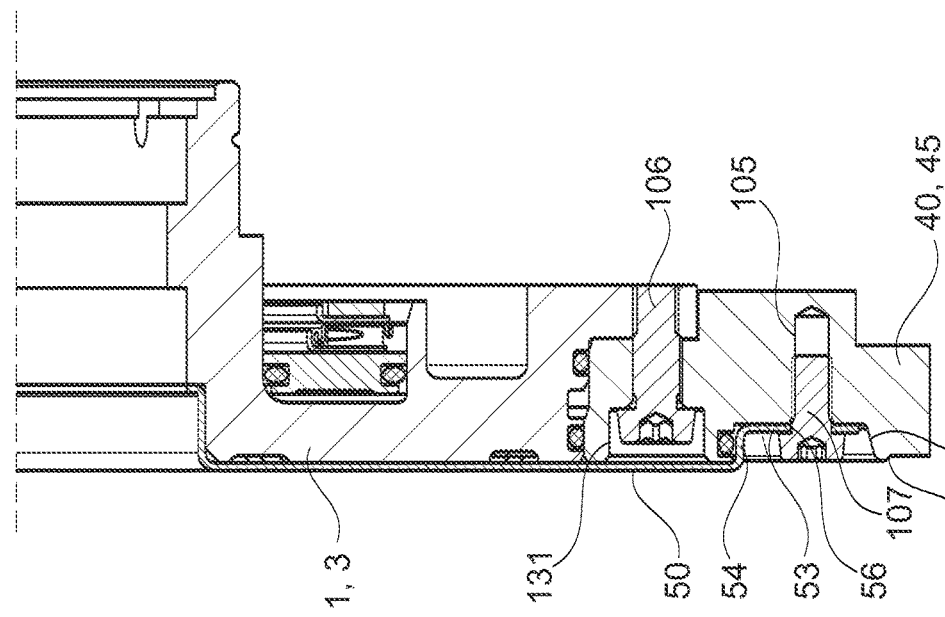
FIG. 6: shows a section of the conducting element arranged in the hybrid module housing, sectioned in a fastening of the cover element.

FIGS. 6 and 7 show the arrangement of the cover element 50.

FIG. 6 shows a section of the conducting element 1 arranged in the hybrid module housing 40, sectioned in a fastening of the cover element 50. A radial housing section 45 of the hybrid module housing 40, on which the conducting element 1 is arranged, is shown, equivalent to the embodiment in FIG. 1. The depicted cover element 50 here has a radial cover extension 53 on the first axial cover extension 54, in particular at the end of the first axial cover extension 54. The cover element 50 thus essentially has a stepped contour in the region of the first axial and radial cover extensions 53, 54. The radial cover extension 53, with its side facing away from the internal combustion engine, here abuts the radial housing section 45 in the axial direction. The radial housing section 45, in the region in which the radial cover extension 53 abuts, here has a second housing bore 105 which extends into the radial housing section 45 in the axial direction. A second bolt 107 is screwed into the second housing bore 105 through an opening 56 in the radial cover extension 53 and rigidly affixes the cover element 50 on the radial housing section 45 and thus on the hybrid module housing 40. It can also be seen that the bolt head of the first bolt 106 is countersunk in an axial countersink 131 in the axial outside 16 of the housing section 45 and is axially covered by the cover element 50. The bolt head of the second bolt 107 is countersunk in a bulge 130 in the axial outside 16 of the housing section 45.

In addition to FIG. 5, FIG. 7 shows a perspective view of the radial housing section 45, in which the conducting element 1 is secured, with the conducting element 1 covered by the cover element 50. Six radial cover extensions 53 can be seen, which are arranged at regular intervals in the circumferential direction.

A second possible embodiment of a conducting element 1 integrated in a hybrid module 4 as well as a hybrid module 4 are shown in FIGS. 8 to 15. The section in a respective sectioned figure is selected at such an angular position that a specific aspect of the disclosure can be seen.

FIGS. 8, 9, 10 and 11 show an assembly sequence of the conducting element 1 in a hybrid module 4 according to a second embodiment.

Figure 8:
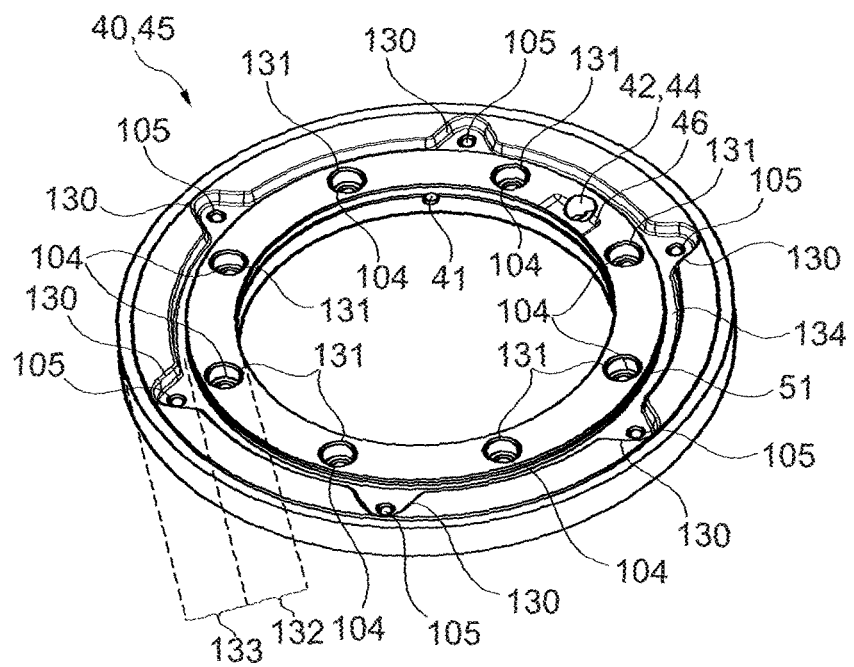
FIG. 8: shows a perspective view of the housing section in which the conducting element can be secured.

In FIG. 8, the radial housing section 45 is shown, in which a conducting element 1 according to the disclosure can be secured. The radial housing section 45 shown in FIG. 8 does not differ from the radial housing section 45 in the figures shown above. The radial housing section 45 can essentially be divided into a radially inner region 132 and a radially outer region 133. Here, bulges 130 are arranged in the radially outer region 133, in which the second housing bores 105 are arranged, wherein the six bulges 130 here are arranged at regular intervals in the circumferential direction. A respective bulge 130 extends essentially in the radial direction radially outward and is recessed in the axial direction from the side facing the internal combustion engine. In the radially inner region 132, the radial housing section 45 has axial countersinks 131 regularly distributed in the circumferential direction, in which the first housing bores 104 are arranged. Furthermore, a cooling line 42 or an axial cooling line section 44 and a housing transition section 46 are arranged between two axial countersinks 131 in the circumferential direction. An annular recess 134 is formed between the radially outer and radially inner region 132 in the axial direction, wherein the bulges 130 extend radially outward from the annular recess 134 and the first cover element seal 51 is arranged on the side of the radially inner region 132 facing the radial recess 134. On the radial inside 15 of the radial housing section 45 or on the radial inside of the radially inner region 132, a pressure line 41 is arranged axially centrally in the radial housing section 45, wherein the pressure line 41 and the cooling line 42 are arranged at different angular positions.

Figures 9, 10:
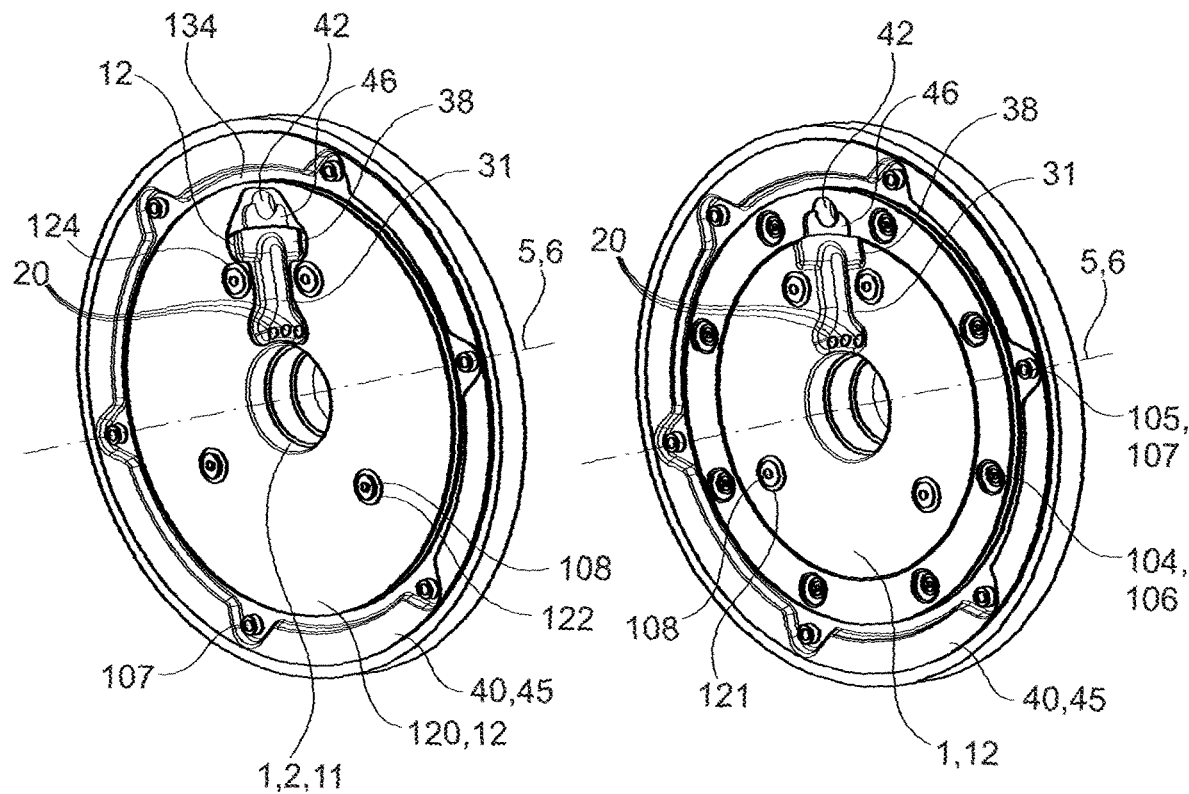
FIG. 9: shows a perspective view of the housing section in which the conducting element is secured.
FIG. 10: shows a perspective view of the housing section in which the conducting element is secured, with the conducting element and sealing washer.

FIG. 9 now shows the radial housing section 45 shown in FIG. 8, wherein the conducting element 1 are arranged here according to the embodiment described in the figures for the first embodiment. In contrast to the first embodiment, which is essentially shown in FIGS. 2 to 7, the conducting element 1 here has only one flow line element 31 on the axial outside 12 of the securing section 3. Also in contrast to the first embodiment, three cooling fluid channels 20, closely adjacent in the circumferential direction and fluidically connected to the flow line element 31, are arranged here in the radially inner end region of the depicted flow line element 31, wherein the flow line element 31 here extends further in the circumferential direction in the radially inner end region than the rest of the flow line element 31. The flow line element 31 and the conducting element transition section 38, which is fluidically connected to the flow line element 31, are arranged essentially at the same angular position as the cooling fluid channel 20 or the housing overflow section 46.

First and second bolts 106, 107 are arranged here in the first and second housing bores 104, 105. Furthermore, the conducting element 1 has fixing bores 121 into which third bolts 108 are screwed. Two of the fixing bores 121 are arranged on opposite sides of the flow line element 31 in the circumferential direction, essentially radially between the radially inner and radially outer end regions.

Both the arrangement of the first bolts 106 and that of the third bolts 108 in FIG. 9 are representative of their position in the finished assembly state of the conducting element 1 in the hybrid module 4. If FIG. 9 is viewed as an intermediate stage in the assembly of a hybrid module 4 according to the disclosure, neither the first nor the third bolts 106, 108 would be arranged at this point in time.

FIG. 10 shows what is shown in FIG. 9, with the addition of a sealing washer 120. The sealing washer 120 is designed as an annular, axially narrow washer, wherein it is delimited radially on the inside by the radial inside 11 of the cylindrical section 2 of the conducting element 1, and radially on the outside by the annular recess 134. The sealing washer 120 has multiple fixing holes 122, wherein the fixing holes 122 are lined up with the fixing bores 121 in the axial direction so that the third bolts 108 can reach through the fixing holes 122 into the fixing bores 121 in order to non-rotatably connect the sealing washer 120 to the conducting element 1 arranged in the hybrid module 4. The sealing washer 120 also comprises a fluid line recess 124. The fluid line recess 124 is designed as an opening extending through the entire axial thickness of the sealing element 120 and has a contour running in one plane, wherein this plane is arranged essentially perpendicular to the axis of rotation 6. The fluid line recess 124, over its entire contour, abuts the axial outside 12 of the securing section 3 of the conducting element 1 and the side of the radial housing section 45 facing the internal combustion engine, but extends closely around the cooling line 42, the transition sections 38, 46 as well as the flow line element 31 so that essentially only these elements are visible of the radially inner region 132 of the housing section 45 and the axial outside 12 of the securing section 3 of the conducting element 1, covered by the sealing washer 120.

As in FIG. 9, both the arrangement of the first bolts 106 and that of the third bolts 108 in FIG. 10 are representative of their position upon completed assembly of the conducting element 1 in the hybrid module 4. If FIG. 10 is viewed as an intermediate stage in the assembly of a hybrid module according to the disclosure, neither the first nor the third bolts 106, 108 would be arranged at this point in time.

In conclusion, FIG. 11 now shows the assembly sequence of the conducting element 1 in a hybrid module 4 according to a second embodiment, the one shown in FIG. 10, with the addition of the cover element 50.

FIG. 11 is essentially identical to FIG. 7, wherein the cover element 50 in FIG. 11 additionally has conical countersinks 123 which, when the cover element 50 is arranged, are lined up with the fixing bores 121 and the fixing holes 122 in the axial direction by first bolts 106 in the radial cover extensions 53. The third bolts 108 are arranged in these conical countersinks 123.

FIGS. 12, 13, 14, and 15 each show a sectional side view of FIG. 11 in different angular positions and thus show the aspects of the second embodiment according to the disclosure.

FIG. 12 essentially shows the same as FIG. 6. A section of the conducting element 1 secured in the hybrid module 4 can be seen. FIG. 12 also comprises the sealing washer 120, wherein FIG. 12 also shows a sectional view of a fixation of the sealing washer 120. The conical countersink 123 can be seen in which a third bolt 108 is arranged, wherein the third bolt 108 is screwed into the fixing bore 121. The bolt head of the third bolt 108 is countersunk in the conical countersink 123. Furthermore, the sealing washer 120 is shown, which is arranged axially between the cover element 50 and the conducting element 1 or the radial housing section 45. The conical countersink 123 extends away from the internal combustion engine.

Figure 13:
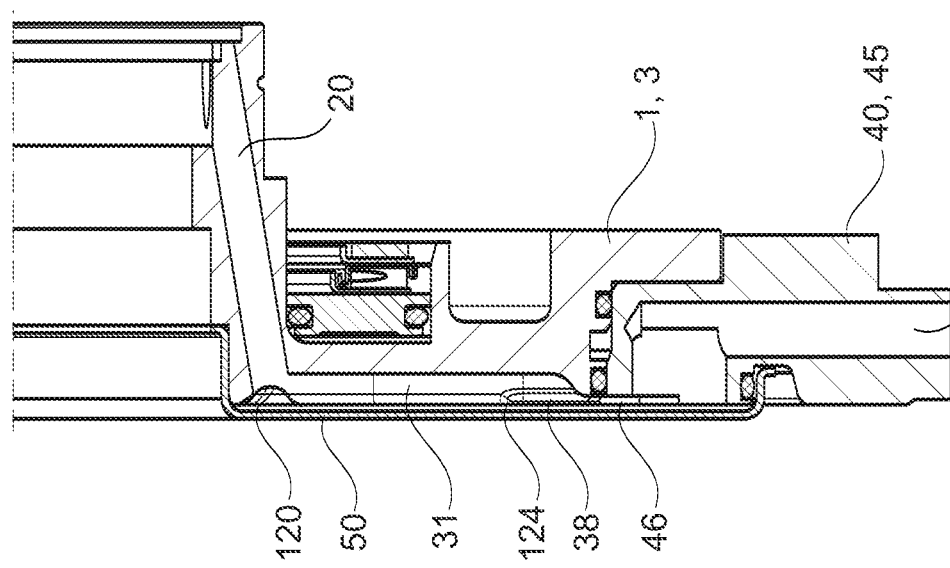
FIG. 13: shows a section of the conducting element secured in the hybrid module housing with a sealing washer, sectioned in a cooling fluid channel.

FIG. 13 shows, equivalent to FIGS. 4 and 5, a section of the conducting element 1 secured in the hybrid module 4, sectioned in a cooling line 42, a flow line element 31 as well as a cooling fluid channel 20. According to the second embodiment, the sealing washer 120 is arranged axially between the cover element 50 and the conducting element 1 or the radial housing section 45. Here, the sealing washer 120 is sectioned in the fluid line recess 124, which shows that, in the overflow sections 38, 46 and for the flow line element 31, the cross-sectional region of the path through which a cooling fluid flows is extended by the axial thickness of the sealing washer 120 or the fluid line recess 124. Furthermore, the sealing washer 120 seals the flow of a cooling fluid, which can be transported here, against the environment.

Figure 14:
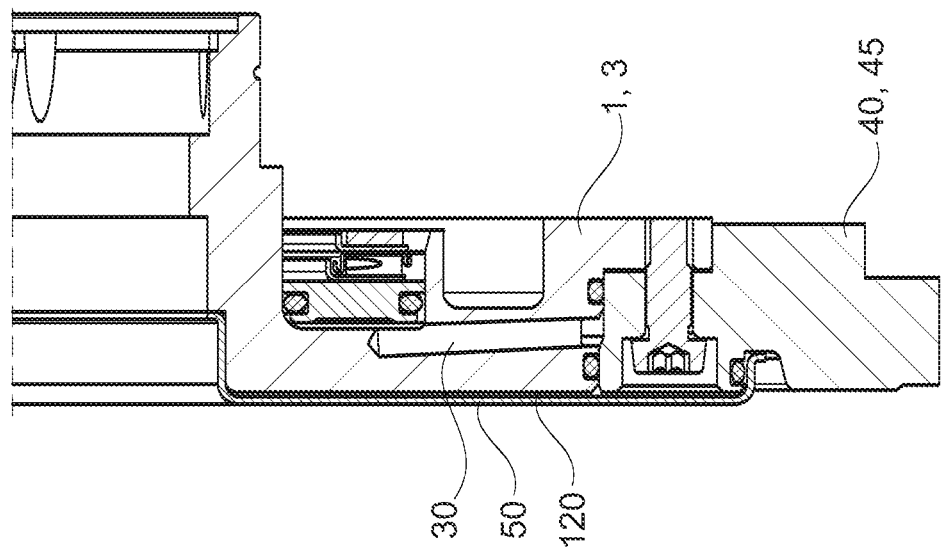
FIG. 14: shows a section of the conducting element secured in the hybrid module housing with a sealing washer, sectioned in a pressurized fluid channel.

FIG. 14 shows, equivalent to FIGS. 2 and 3, a section of the conducting element 1 secured in the hybrid module 4, sectioned in a pressurized fluid channel 30. Here, the sealing washer 120, which is arranged axially between the cover element 50 and the conducting element 1 or the radial housing section 45, is also shown. It can thus be seen from FIG. 14 that the arrangement of the sealing washer 120 according to the second embodiment has no effect on the path of a pressurized fluid.

Figure 15:
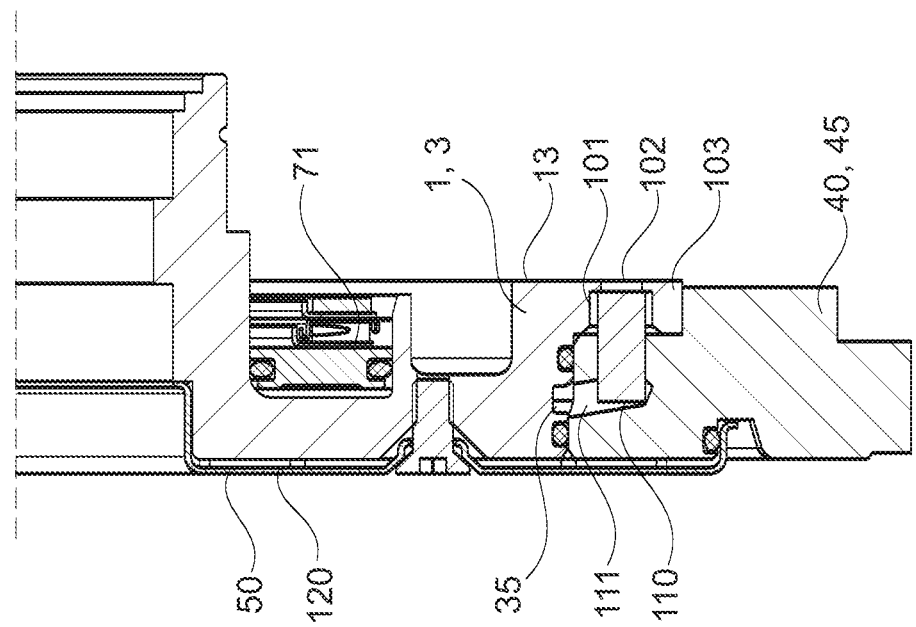
FIG. 15: shows a section of the conducting element secured in the hybrid module housing with a sealing washer, sectioned in a ventilation channel and a ventilation valve.

FIG. 15 shows, equivalent to FIG. 12, a section of the conducting element 1 secured in the hybrid module 4, sectioned in a fixation of the sealing washer 120. It is shown here that the radial housing section 45 comprises a ventilation channel 111 which extends from the radial inside 15 of the housing section 45 to the radial outside essentially in the radial direction. The ventilation channel 111 is designed as a hollow cylinder and is fluidically connected to the circumferential channel 35 of the conducting element 1. Here, a ventilation valve 110 is arranged in the ventilation channel 111, which extends essentially in the axial direction and is fluidically connected to the ventilation channel 111. In the axial direction, the ventilation valve 110 extends into a valve cavity 101 formed in the securing protrusion 103, which is fluidically connected to a valve outlet opening 102 formed on the axial inside 13 of the securing section 3 in the axial direction. By means of the ventilation valve 110, air can thus be released from the fluid line of a pressurized fluid to the environment outside the conducting element 1 in order to ensure long-term reliable actuation of the piston 71. The arrangement of a ventilation valve 110 can thus be used regardless of the design with or without a sealing washer 120.

With the embodiment according to the disclosure of the conducting element proposed here, a possibility for fluid conducting is created which combines the transport of cooling fluid and pressurized fluid in a fluidically separated manner and with limited axial installation space in a component.

LIST OF REFERENCE SYMBOLS

1 Conducting element
2 Cylindrical section
3 Securing section
4 Hybrid module
5 Cylinder axis of the conducting element
6 Rotational axis of the hybrid module
10 Radial outside of the cylindrical section
11 Radial inside of the cylindrical section
12 Axial outside of the securing section
13 Axial inside of the securing section
14 Radial outside of the securing section
15 Radial inside of the housing section
16 Axial outside of the housing section
17 Axial inside of the housing section
20 Cooling fluid channel
21 Thread
30 Pressurized fluid channel
31 Flow line element
32 First hollow-cylindrical space
33 Second hollow-cylindrical space
34 Annular actuating cylinder
35 Circumferential channel
36 First circumferential annular groove
37 Second circumferential annular groove
38 Conducting element overflow section
39 Pressurized fluid seal
40 Hybrid module housing
41 Pressure line
42 Cooling line
43 Radial cooling line section
44 Axial cooling line section
45 Radial housing section
46 Housing overflow section
50 Cover element
51 First cover element seal
52 Second cover element seal
53 Radial cover extension
54 First axial cover extension
55 Second axial cover extension
56 Opening
60 Intermediate shaft
61 Bias nut
62 First rotary bearing
63 Second rotary bearing
64 Third rotary bearing
70 Actuating device
71 Piston
72 Piston seal element
73 Return spring
80 Clutch unit
81 Separating clutch
82 First partial clutch
83 Second partial clutch
90 Electric machine
91 Stator
92 Rotor
93 Rotor carrier
100 Securing bores
101 Valve cavity
102 Valve outlet opening
103 Securing protrusion
104 First housing bore
105 Second housing bore
106 First bolt
107 Second bolt
108 Third bolt
110 Ventilation valve
111 Ventilation channel
120 Sealing washer
121 Fixing bore
122 Fixing holes
123 Conical countersink
124 Fluid line recess
130 Bulge
131 Axial countersinks
132 Radially inner region
133 Radially outer region
134 Annular recess
200 Vibration damper
201 First transmission input shaft
202 Second transmission input shaft
203 Fourth rotary bearing
204 Fifth rotary bearing
205 Sixth rotary bearing
206 Actuating line carrier
207 Output shaft

The invention claimed is:

1. A conducting element for conducting a pressurized fluid for hydraulically actuating an actuating device of a clutch unit and for conducting a cooling fluid for cooling a clutch unit, the conducting element comprising:
a cylindrical section;
a securing section arranged essentially in a plane which extends perpendicular to a cylinder axis of the cylindrical section and mechanically connected to the cylindrical section;
a pressurized fluid channel that extends essentially radially to the cylinder axis is formed in the securing section and is configured to transport pressurized fluid radially inward for supplying a hydraulic actuating device that is arrangeable on or in the securing section;
wherein the securing section on an axial outside forms a flow line element that extends essentially radially to the cylinder axis and is configured to transport cooling fluid radially inward;
at least one cooling fluid channel formed in the cylindrical section with at least one axial direction component;
wherein the flow line element is fluidically connected to the cooling fluid channel and is adapted to supply at least one of the clutch unit or an electric machine that is arrangeable in the surroundings of the conducting element with cooling fluid.

2. The conducting element according to claim 1, wherein the securing section forms a hollow-cylindrical space adapted for forming an annular actuating cylinder of the actuating device and is adapted to receive an annular piston, and the pressurized fluid channel is fluidically connected to the hollow-cylindrical space in order to conduct a pressurized fluid into the hollow-cylindrical space to move the piston arranged there.

3. The conducting element according to claim 1, wherein the securing section, at least in some regions, forms a circumferential channel on a radial outside thereof which is fluidically connected to the pressurized fluid channel.

4. The conducting element according to claim 1, wherein the flow line element comprises a depression in the axial outside of the securing section.

5. The conducting element according to claim 4, further comprising a sealing washer arranged axially on the axial outside of the securing section and, at least in some regions, the sealing washer abuts the axial outside of the securing section, and the sealing washer comprises a fluid line recess that has a contour formed at least around the flow line element in the axial direction.

6. The conducting element according to claim 1, further comprising a circumferential annular groove for transferring fluid to the flow line element arranged on the axial outside of the securing section, and the annular groove is fluidically connected to the flow line element.

7. The conducting element according to claim 1, wherein the flow line element is fluidically connected to multiple cooling fluid channels.

8. The conducting element according to claim 1, wherein the cooling fluid channel comprises a hollow cylinder and, in addition to the axial direction component thereof in the cylindrical section, also includes a radial direction component, and the cooling fluid channel approaches the cylinder axis as a distance from the securing section increases.

9. A hybrid module for a motor vehicle for coupling an internal combustion engine as well as a transmission, the hybrid module comprising an electric machine, a hybrid module housing, as well as a conducting element according to claim 1, rigidly connected thereto, and at least one pressure line for supplying a pressurized fluid and a cooling line for supplying a cooling fluid to the conducting element, wherein the pressure line is fluidically connected to the pressurized fluid channel in the securing section and the cooling line is fluidically connected to the flow line element.

10. A drive assembly comprising a hybrid module according to claim 9, a drive unit, and a transmission, wherein the hybrid module is mechanically connected to the drive unit and the transmission via at least one clutch unit of the hybrid module.

11. A conducting element for conducting a pressurized fluid for hydraulically actuating an actuating device of a clutch unit and for conducting a cooling fluid for cooling a clutch unit, the conducting element comprising:
a cylindrical section;
a securing section arranged perpendicular to a cylinder axis of the cylindrical section and connected to the cylindrical section;
a hydraulic actuating device arranged in the securing section;
a pressurized fluid channel that extends radially to the cylinder axis is formed in the securing section and is configured to transport pressurized fluid radially inward for supplying the hydraulic actuating device;
wherein the securing section on an axial outside thereof includes a flow line element that extends essentially radially to the cylinder axis and is configured to transport cooling fluid radially inward;
at least one cooling fluid channel formed in the cylindrical section that extends axially;
wherein the flow line element is fluidically connected to the cooling fluid channel and is adapted to supply at least one of the clutch unit or an electric machine that is arrangeable in the surroundings of the conducting element with cooling fluid.

12. The conducting element of claim 11, wherein the securing section includes a hollow-cylindrical space that forms an annular actuating cylinder of the actuating device, and an annular piston is located in the annular actuating cylinder, wherein the pressurized fluid channel is fluidically connected to the hollow-cylindrical space in order to conduct pressurized fluid into the hollow-cylindrical space to move the annular.

13. The conducting element of claim 11, wherein the flow line element comprises a depression in the axial outside of the securing section.

14. The conducting element of claim 13, further comprising a sealing washer arranged axially on the axial outside of the securing section, and the sealing washer comprises a fluid line recess that has a contour formed at least around the flow line element in the axial direction.

15. The conducting element of claim 11, further comprising a circumferential annular groove for transferring to the flow line element arranged on the axial outside of the securing section, and the annular groove is fluidically connected to the flow line element.

16. The conducting element of claim 11, wherein the flow line element is fluidically connected to multiple cooling fluid channels.

17. The conducting element of claim 11, wherein the cooling fluid channel comprises a hollow cylinder that extends axially and radially such that as a distance from the securing section increases the cooling fluid channel gets closer to the cylinder axis.

18. The conducting element of claim 11, further comprising a circumferential annular groove for transferring fluid to the flow line element arranged on the axial outside of the securing section, and the annular groove is fluidically connected to the flow line element.

* * * * *